(12) United States Patent
Tsuda et al.

(10) Patent No.: US 10,839,679 B2
(45) Date of Patent: Nov. 17, 2020

(54) AUTONOMOUS TRAVEL ASSISTANCE DEVICE, ROADSIDE DEVICE, AND AUTONOMOUS TRAVEL ASSISTANCE SYSTEM

(71) Applicant: Mitsubishi Electric Corporation, Chiyoda-ku (JP)

(72) Inventors: Yoshiaki Tsuda, Chiyoda-ku (JP); Toshiki Kawase, Chiyoda-ku (JP); Tsuneo Sato, Chiyoda-ku (JP); Yukishiro Saito, Chiyoda-ku (JP); Kuniaki Miyazaki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 171 days.

(21) Appl. No.: 16/077,964

(22) PCT Filed: Feb. 1, 2017

(86) PCT No.: PCT/JP2017/003616
§ 371 (c)(1),
(2) Date: Aug. 14, 2018

(87) PCT Pub. No.: WO2017/150059
PCT Pub. Date: Sep. 8, 2017

(65) Prior Publication Data
US 2019/0392708 A1 Dec. 26, 2019

(30) Foreign Application Priority Data
Mar. 2, 2016 (JP) ................. 2016-039809

(51) Int. Cl.
*G08G 1/09* (2006.01)
*G05D 1/00* (2006.01)
*G08G 1/01* (2006.01)

(52) U.S. Cl.
CPC ........... *G08G 1/091* (2013.01); *G05D 1/0088* (2013.01); *G08G 1/0125* (2013.01); *G05D 2201/0213* (2013.01)

(58) Field of Classification Search
CPC ................. G08G 1/091; G08G 1/0125; G08G 1/096725; G08G 1/096791; G08G 1/09;
(Continued)

(56) References Cited

U.S. PATENT DOCUMENTS 6,115,652 A 9/2000 Sato et al.
2008/0167821 A1 7/2008 Breed
(Continued)

FOREIGN PATENT DOCUMENTS

JP 2002-340583 A 11/2002
JP 2004-185429 A 7/2004
(Continued)

OTHER PUBLICATIONS

Extended European Search Report dated Jan. 29, 2019 in European Patent Application No. 17759530.3, 8 pages.
(Continued)

*Primary Examiner* — Rodney A Butler
(74) *Attorney, Agent, or Firm* — Oblon, McClelland, Maier & Neustadt, L.L.P.

(57) ABSTRACT

A map database stores map data. The map data includes position reference point data including identification information of a position reference point being set in an intersection area where traffic lanes intersect, join, or diverge and an absolute position of the position reference point. A communication system receives the identification information of the position reference point and a relative position of another vehicle to the absolute position of the position reference point. A vehicle position information processing unit acquires the absolute position of the position reference
(Continued)

point from the position reference point data on the basis of the received identification information of the position reference point. Then, the vehicle position information processing unit specifies a position of the another vehicle on the basis of the acquired absolute position of the position reference point and the received relative position of the another vehicle.

4 Claims, 14 Drawing Sheets

(58) Field of Classification Search
CPC ........... G08G 1/0965; G08G 1/096766; G08G 1/0968; G08G 1/161; G05D 1/0088; G05D 2201/0213
See application file for complete search history.

(56) References Cited

U.S. PATENT DOCUMENTS

| | | |
|---|---|---|
| 2010/0019937 A1 | 1/2010 | Mori et al. |
| 2013/0099911 A1 | 4/2013 | Mudalige et al. |
| 2014/0210646 A1* | 7/2014 | Subramanya ...... G06K 9/00812 340/928 |
| 2015/0100178 A1 | 4/2015 | Chiba et al. |
| 2017/0124869 A1* | 5/2017 | Popple .................. G08G 1/087 |
| 2017/0278387 A1* | 9/2017 | Okazaki ............... G08G 1/0125 |

FOREIGN PATENT DOCUMENTS

| | | |
|---|---|---|
| JP | 2007-264878 A | 10/2007 |
| JP | 2008-18872 A | 1/2008 |
| JP | 2009-87372 A | 4/2009 |
| JP | 2009-230377 A | 10/2009 |
| JP | 2010-282522 A | 12/2010 |
| JP | 2012-85202 A | 4/2012 |
| JP | 2013-101013 A | 5/2013 |
| JP | 2015-75957 A | 4/2015 |
| JP | 2016-7954 A | 1/2016 |

OTHER PUBLICATIONS

Korean Office Action dated Nov. 17, 2019 in Korean Patent Application No. 10-2018-7024312 (with unedited computer generated English translation), 16 pages.

International Search Report dated Apr. 4, 2017 in PCT/JP2017/003616 filed Feb. 1, 2017.

Council on Competitiveness—Nippon, Fiscal 2014, Project, Final report, "Service using three-dimensional position information and preparation of common infrastructure", Mar. 5, 2015, Council on Competitiveness—Nippon COCN (with English translation), 63 pages.

Combined Chinese Office Action and Search Report dated Jul. 23, 2020 in corresponding Chinese Patent Application No. 201780012901.4 (with English Translation and English Translation of Category of Cited Documents), 24 pages.

* cited by examiner

Fig. 4

205: POSITION REFERENCE POINT DATA

| POSITION REFERENCE POINT ID | POSITION INFORMATION (ABSOLUTE POSITION) | ATTRIBUTE INFORMATION |
|---|---|---|
| ⋮ | ⋮ | ⋮ |
| $Mr_{10}$ | NORTH LATITUDE 35° 29′ 13″<br>EAST LONGITUDE 137° 24′ 8″<br>ALTITUDE 312.9m | $L_x$ |
| ⋮ | ⋮ | ⋮ |
| $Mr_{100}$ | NORTH LATITUDE 35° 48′ 6″<br>EAST LONGITUDE 138° 25′ 3″<br>ALTITUDE 1016.7m | $L_y$ |
| ⋮ | ⋮ | ⋮ |
| $Mr_{1000}$ | NORTH LATITUDE 40° 6′ 2″<br>EAST LONGITUDE 140° 40′ 8″<br>ALTITUDE 499.4m | $L_z$ |
| ⋮ | ⋮ | ⋮ |

INTERSECTION

DIVERGING POINT

JUNCTION

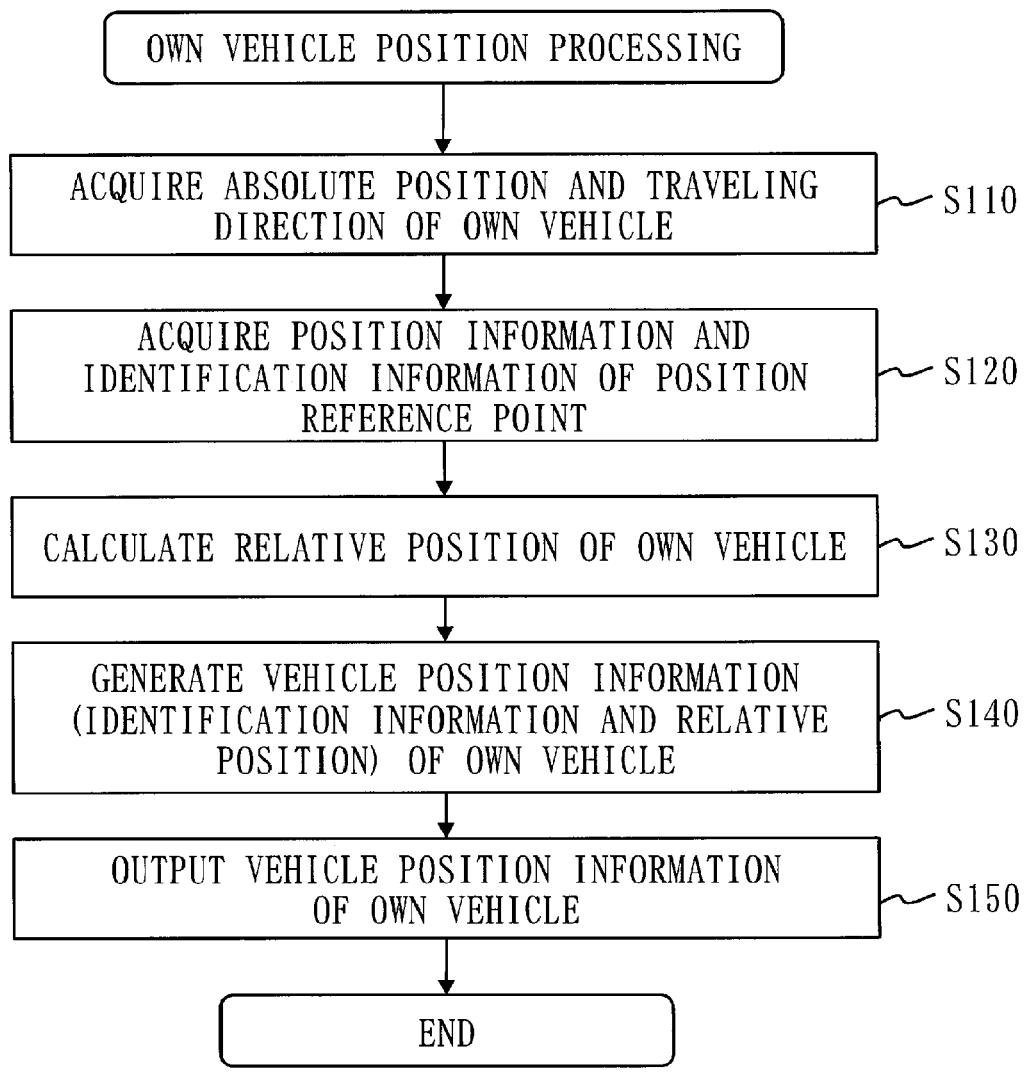

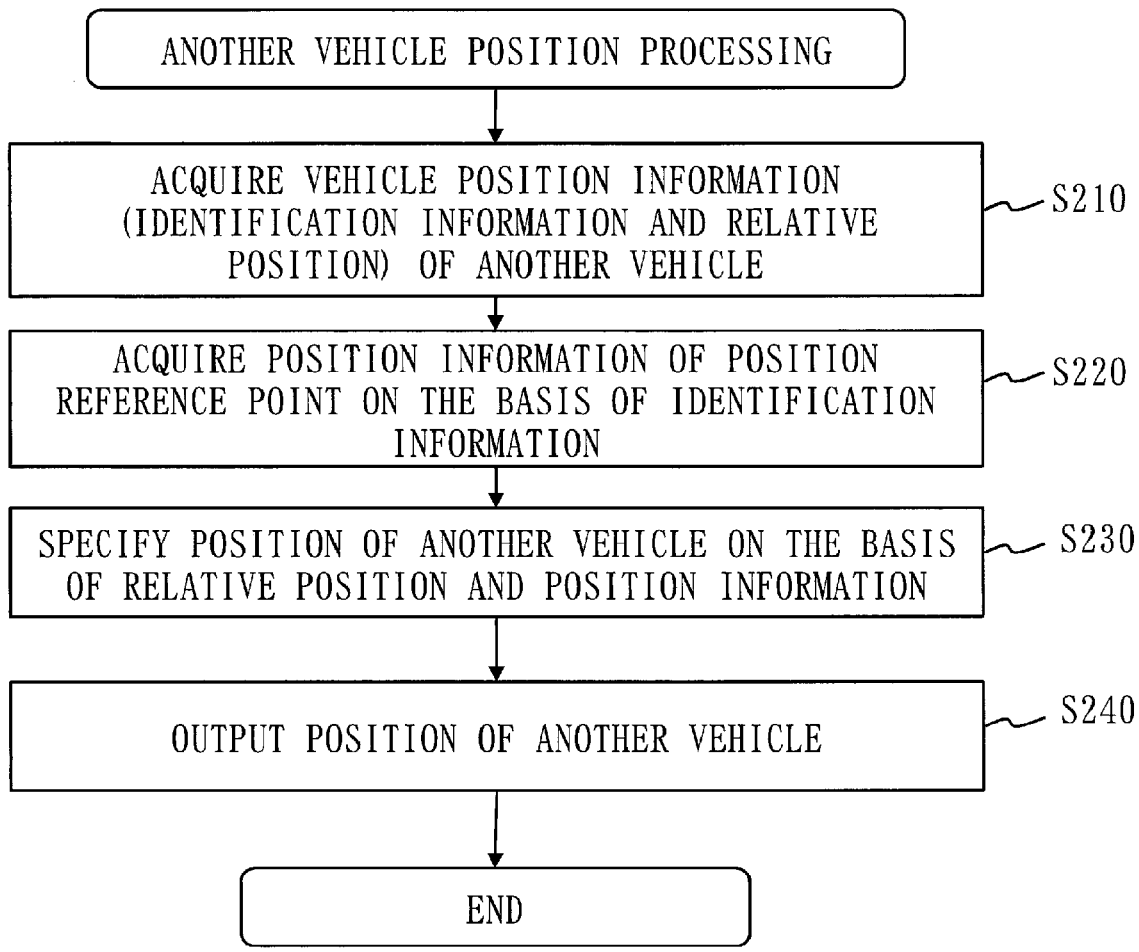

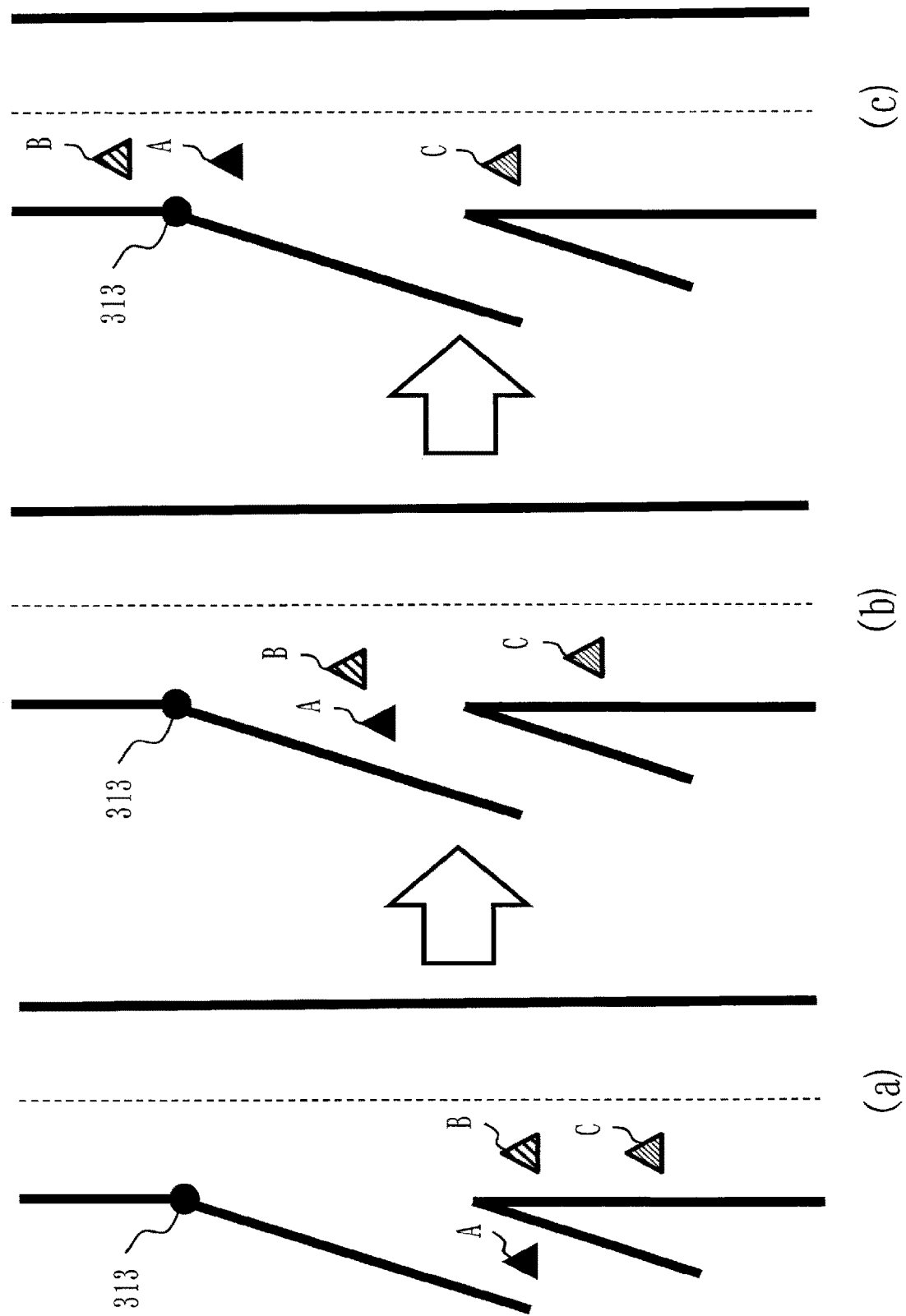

AUTONOMOUS TRAVEL ASSISTANCE DEVICE, ROADSIDE DEVICE, AND AUTONOMOUS TRAVEL ASSISTANCE SYSTEM

TECHNICAL FIELD

The present invention relates to an autonomous travel assistance system and particularly relates to an autonomous travel assistance system in which information provided from another vehicle or a roadside device and a map are used.

BACKGROUND ART

In an autonomous travel assistance system, it is necessary to acquire dynamic information regarding another vehicle, specifically, presence information and position information of another vehicle traveling toward the same intersection area at the same timing at a junction or the like of traffic lanes.

It is possible to specify presence and a position of another vehicle by using a sensor device such as a millimeter-wave radar or a video camera mounted on a vehicle. However, regarding a vehicle positioned at a blind spot and a vehicle positioned at a far place, it is difficult to accurately grasp presence and positions thereof by using the sensor device.

Meanwhile, an autonomous vehicle acquires a current position of the own vehicle on the basis of signals of a global positioning system (GPS) or quasi-zenith satellites (QZS). Then, the autonomous vehicle transmits the acquired current position of the own vehicle at predetermined periods to a surrounding vehicle via a roadside device or directly. Further, the autonomous vehicle receives a current position of another vehicle at predetermined periods via the roadside device or directly. With this, it is possible to use position information of the another vehicle.

Non-Patent Literature 1 discloses that a new service that supports smart movement of vehicles can be created as business by preparing an infrastructure for highly accurate three-dimensional position information.

CITATION LIST

Non Patent Literature

No-Patent Literature 1: Council on Competitiveness-Nippon, Fiscal 2014, Project, Final report "Service using three-dimensional position information and preparation of common infrastructure", Council on Competitiveness-Nippon

SUMMARY OF INVENTION

Technical Problem

An object of the invention is to provide a system that achieves autonomous travel assistance by using dynamic information of another vehicle provided from the another vehicle or a roadside device and a map.

Solution to Problem

An autonomous travel assistance device of the present invention is mounted on own vehicle The autonomous travel assistance device includes:
a storage unit to store position reference point data including identification information of a position reference point being set in an intersection area where traffic lanes intersect, join, or diverge and position information of the position reference point that is common to another vehicle;
a receiving unit to receive the identification information of the position reference point and a relative position of the another vehicle to the position information of the position reference point; and
a specification unit to acquire the position information of the position reference point from the position reference point data on the basis of the received identification information of the position reference point and specify a position of the another vehicle on the basis of the acquired position information of the position reference point and the received relative position of the another vehicle.

Advantageous Effects of Invention

According to the invention, relative positions of other vehicles based on a position reference point having an absolute position used in common by vehicles are mutually used by the vehicles. Therefore, even in a case where maps used in navigation systems of the respective vehicles are different and there is a difference in coordinate value between the maps, it is possible to accurately specify a position of another vehicle. With this, in an area such as a junction, an intersection, or a diverging point of traffic lanes, it is possible to avoid a collision with another vehicle traveling toward the area.

Therefore, it is possible to provide a system that achieves autonomous travel assistance by using dynamic information (relative position) of another vehicle provided from the another vehicle or a roadside device and map information (position reference point).

BRIEF DESCRIPTION OF DRAWINGS

FIG. 4 is a data structure diagram of position reference point data 205 in Embodiment 1.

FIG. 6 is a flowchart of own vehicle position processing in Embodiment 1.

FIG. 7 is a flowchart of another vehicle position processing in Embodiment 1.

FIG. 8 is a diagram for describing autonomous travel assistance in Embodiment 1.

DESCRIPTION OF EMBODIMENTS

Embodiment 1

Figure 1:
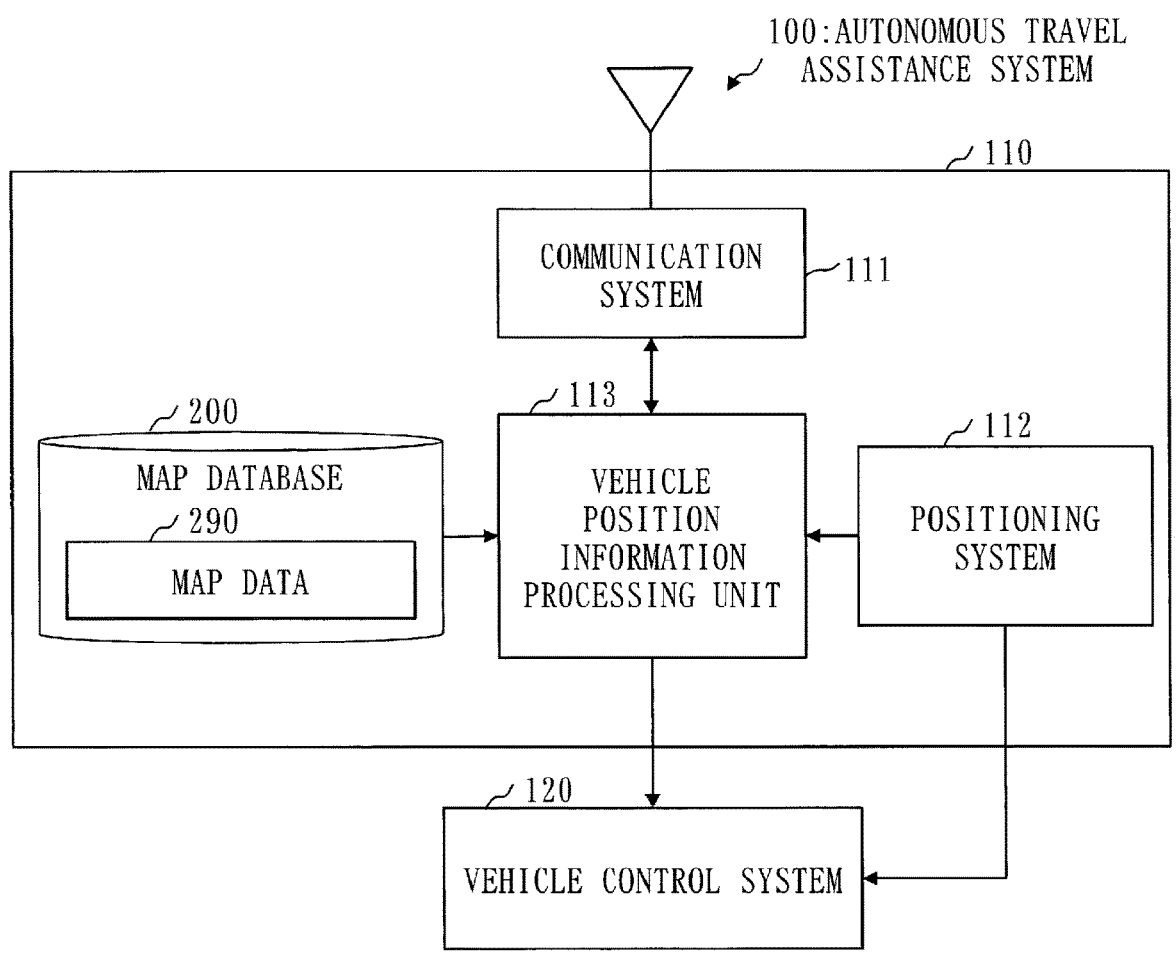
FIG. 1 is a block diagram of an autonomous travel assistance system 100 in Embodiment 1.

An autonomous travel assistance system 100 will be described with reference to FIG. 1 to FIG. 12.
*Description of System Configuration*
A configuration of the autonomous travel assistance system 100 will be described with reference to FIG. 1.

The autonomous travel assistance system 100 is a system for assisting in autonomous travel of a vehicle and is mounted on the vehicle.

The autonomous travel assistance system 100 is provided with an autonomous travel assistance device 110 and a vehicle control system 120.

The autonomous travel assistance device 110 is a device corresponding to an in-vehicle device.

The vehicle control system 120 is a system that controls the vehicle.

The autonomous travel assistance device 110 is provided with a communication system 111, a positioning system 112, a map database 200, and a vehicle position information processing unit 113.

The communication system 111 communicates with a roadside device and another vehicle. Specifically, the communication system 111 receives position information of another vehicle and transmits position information of the own vehicle. The positioning system 112 is configured as a combination of a satellite positioning device and an inertial navigation system and measures a position and traveling direction of the own vehicle.

The map database 200 is provided with map data 290. The map data 290 is configured as data necessary for autonomous travel assistance. In other words, the map data 290 is configured as data regarding a road shape, a road object, and the like. The road object is an object on a road or in the vicinity of the road.

The vehicle position information processing unit 113 specifies a position of the another vehicle on the basis of the position information of the another vehicle acquired via the communication system 111 and the data acquired from the map database 200. Further, the vehicle position information processing unit 113 generates position information of the own vehicle on the basis of the position of the own vehicle measured by the positioning system 112 and the data acquired from the map database 200.

The vehicle control system 120 controls the own vehicle on the basis of the position of the another vehicle specified by the vehicle position information processing unit 113 and the position of the own vehicle measured by the positioning system 112. Specifically, the vehicle control system 120 controls acceleration, steering, braking, and the like.

Figure 2:
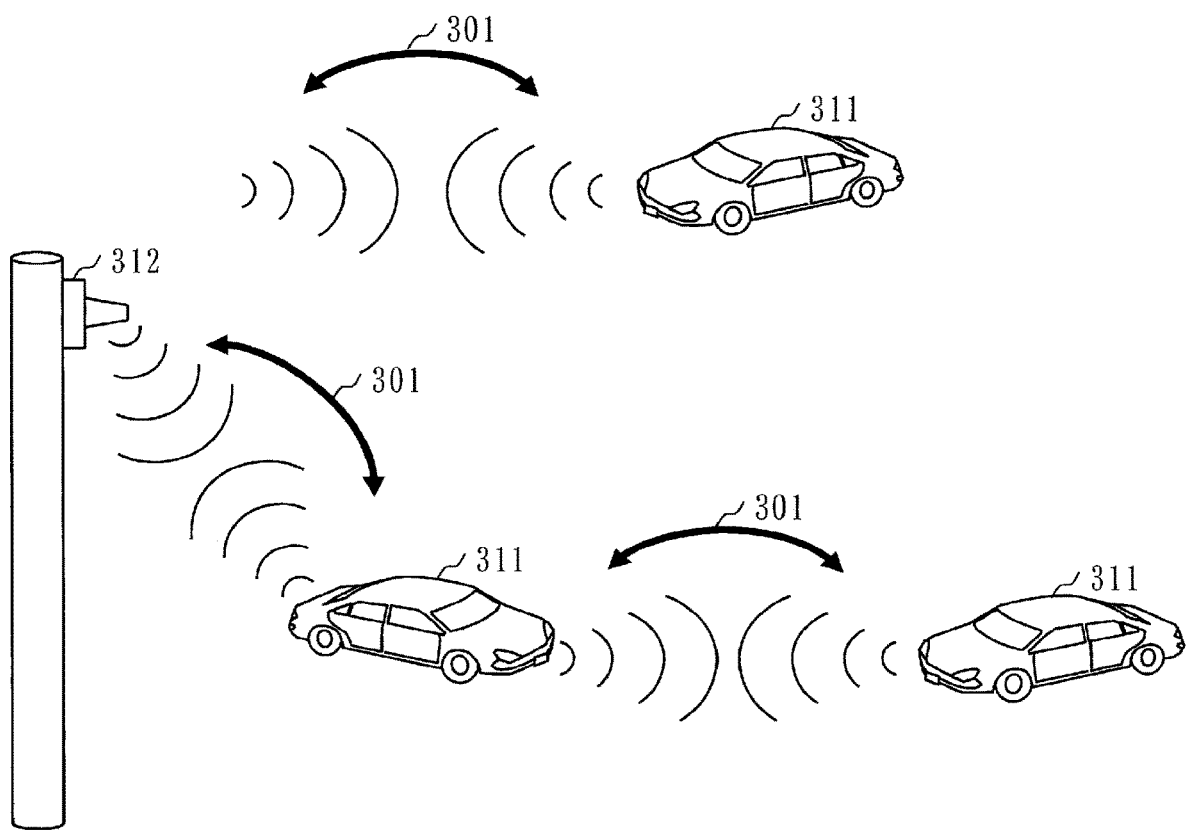
FIG. 2 is a diagram for describing transmission/reception of vehicle position information in Embodiment 1.

Transmission/reception of vehicle position information 301 performed by using the communication system 111 will be described with reference to FIG. 2.

A vehicle 311 transmits vehicle position information 301 of the own vehicle and receives vehicle position information 301 of another vehicle.

The vehicle position information 301 is communicated via road-to-vehicle communication or vehicle-to-vehicle communication.

The road-to-vehicle communication is communication performed between the roadside device 312 and the vehicle 311.

The vehicle-to-vehicle communication is communication directly performed between the vehicles 311.

Figure 3:
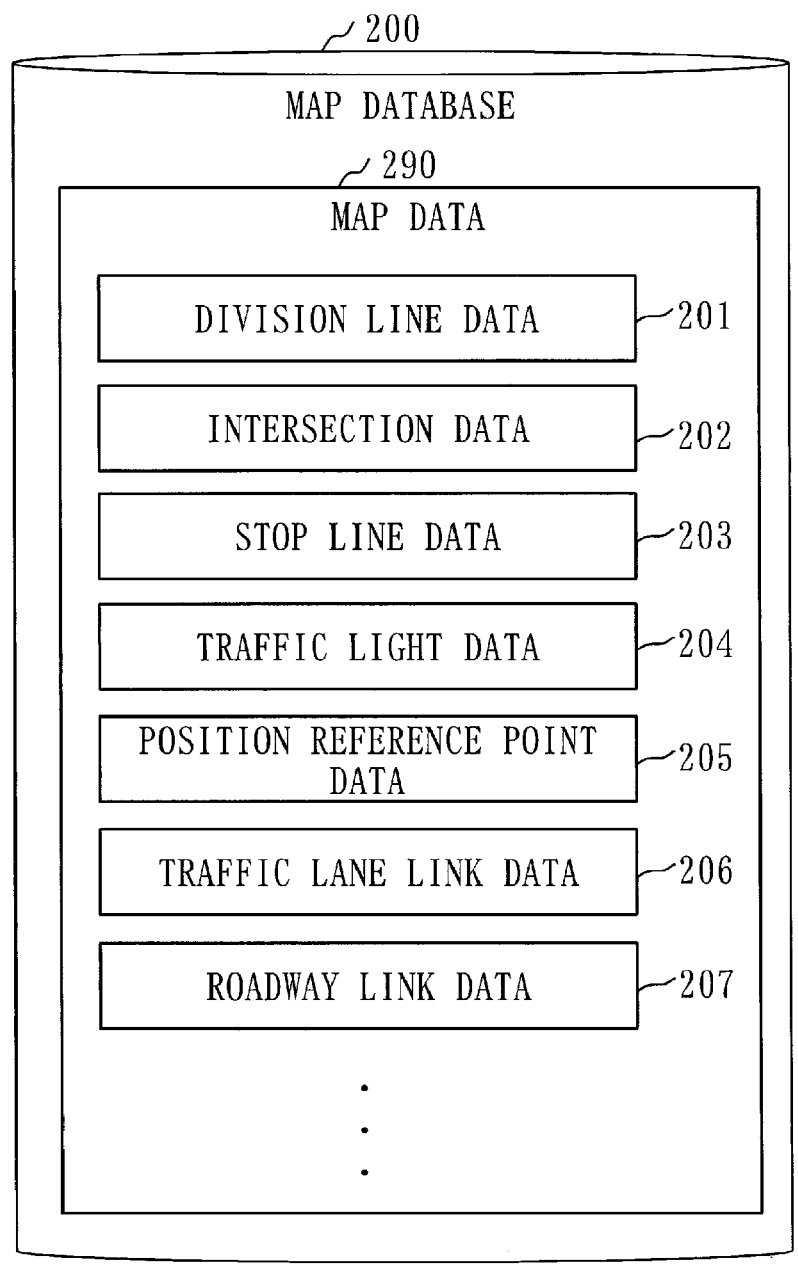
FIG. 3 is a data structure diagram of a map database 200 in Embodiment 1.

A data structure of the map database 200 will be described with reference to FIG. 3.

In order to assist in autonomous travel, there is needed the map data 290 with which a shape of a road and an object existing in the vicinity of the road can be specified.

The map database 200 stores, as the map data 290, division line data 201, intersection data 202, stop line data 203, traffic light data 204, position reference point data 205, traffic lane link data 206, and roadway link data 207, and the like.

The division line data 201 is data regarding a division line such as a position of a division line. The division line is a line marked on a road and divides traffic lanes and roadways. The roadway is a road on which the vehicle 311 travels and has one or more traffic lanes and the like.

The intersection data 202 is data regarding an intersection area such as a position of an intersection. The intersection is a place where two or more roads intersect. The intersection area is an area where traffic lanes intersect, join, or diverge. A specific intersection area is a crossroad, a T junction, or another intersection.

The stop line data 203 is data regarding a stop line.
The traffic light data 204 is data regarding traffic light.
The position reference point data 205 is data regarding a position reference point.

The position reference point is set at an important position such as a stop line and an intersection area and serves as an origin of a relative position of the own vehicle and a relative position of another vehicle. In other words, the position reference point is a position reference point serving as a reference for expressing a relative position.

The traffic lane link data 206 is data regarding a traffic lane link. The traffic lane link defines a center line of a traffic lane.

The roadway link data 207 is data regarding a roadway link. The roadway link defines a center line of a roadway having one or more traffic lanes.

A data structure of the position reference point data 205 will be described with reference to FIG. 4.

A position reference point ID, position information, and attribute information are included in the position reference point data 205 while being associated with one another for each position reference point.

The position reference point ID is identification information for identifying a position reference point. Note that the position information may be used as identification information.

The position information indicates an absolute position of the position reference point. The absolute position is a position determined on the basis of a certain position on the earth serving as an origin and is a coordinate value that can be expressed by using a latitude, a longitude, and an altitude. Even in a case where maps used in navigation systems of the vehicles 311 are different, the position information of the position reference point is common to the vehicles 311.

The attribute information indicates an attribute that the position reference point has. For example, the attribute information indicates a roadway link ID. This roadway link ID identifies a roadway link connected to an intersection area existing in the vicinity of the position reference point.

The position reference point 313 will be described with reference to FIG. 5A, FIG. 5B, and FIG. 5C.

Figure 5A:
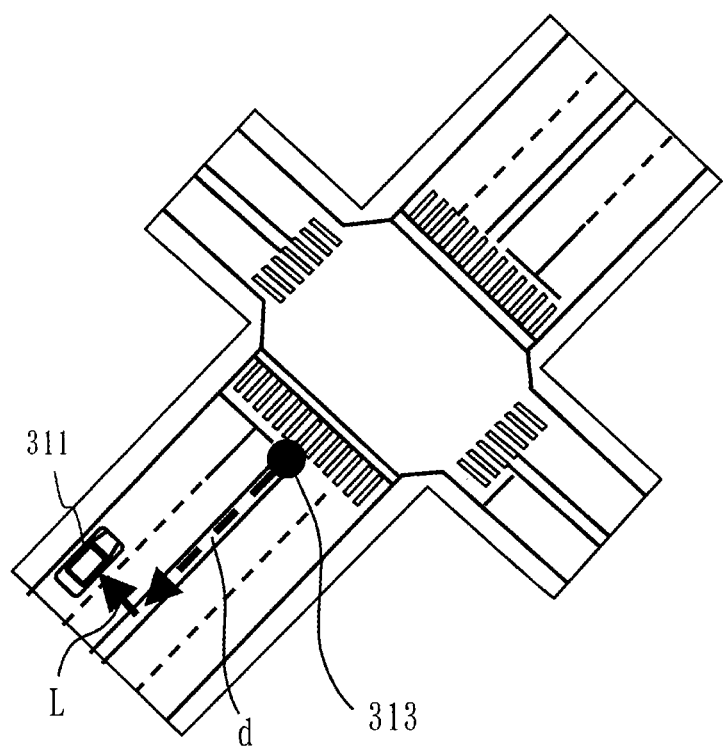
FIG. 5A is a diagram illustrating an example where a position reference point 313 in Embodiment 1 is provided at an intersection.
Figure 5B:
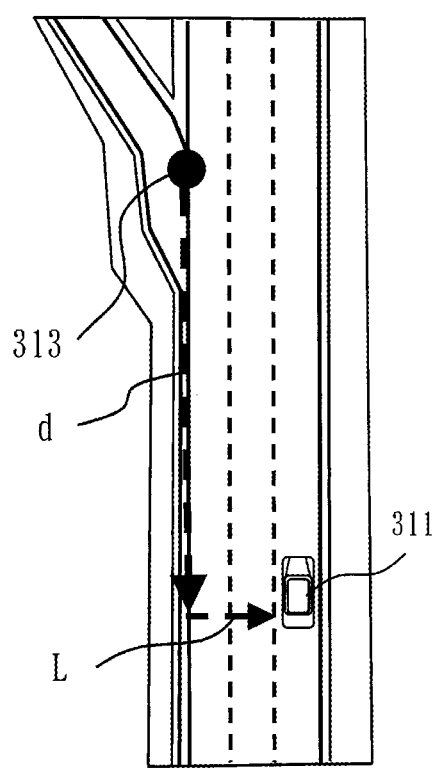
FIG. 5B is a diagram illustrating an example where the position reference point 313 in Embodiment 1 is provided in front of a diverging point.
Figure 5C:
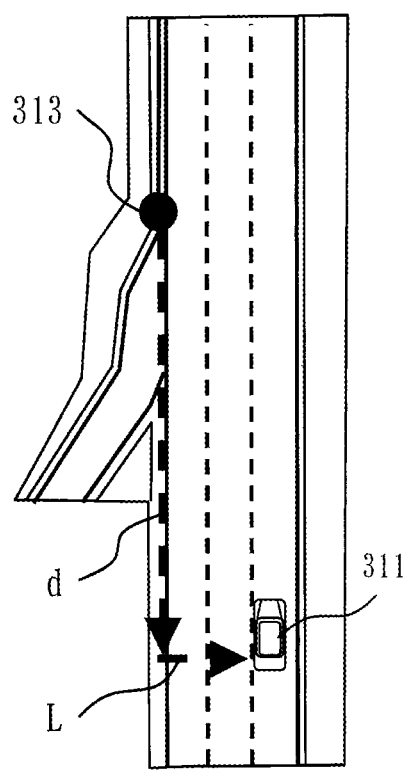
FIG. 5C is a diagram illustrating an example where the position reference point 313 in Embodiment 1 is provided in front of a junction.

The position reference point 313 is provided at positions illustrated in FIG. 5A, FIG. 5B, and FIG. 5C.

FIG. 5A illustrates an example where the position reference point 313 is provided at a right end of a stop line in front of an intersection. The vehicle 311 travels toward a direction in which the intersection is positioned.

FIG. 5B illustrates an example where the position reference point 313 is provided at a diverging point of traffic lanes. The vehicle 311 travels toward a direction in which the diverging point is positioned.

FIG. 5C illustrates an example where the position reference point 313 is provided at a junction of traffic lanes. The vehicle 311 travels toward a direction in which the junction is positioned.

Note that the position of the position reference point 313 is not limited to the positions illustrated in FIG. 5A, FIG. 5B, and FIG. 5C.

FIG. 5A, the position reference point 313 may be provided at the center of the intersection.

In FIG. 5B, the position reference point 313 may be provided in front of the diverging point in the traveling direction of the vehicle 311.

In FIG. 5C, the position reference point 313 may be provided in front of the junction in the traveling direction of the vehicle 311.

As illustrated in of FIG. 5A, FIG. 5B. and FIG. 5C, the position of the vehicle 311 can be expressed as a relative position to the position reference point 313.

Specifically, the position of the vehicle 311 can be expressed by using a distance d and an offset L. The distance d is a distance between the position reference point 313 and the vehicle 311 in a length direction of a road. The offset L is a distance between the position reference point 313 and the vehicle 311 in a width direction of the road. The offset L may be the number of traffic lanes between a traffic lane on which the position reference point 313 is positioned and a traffic lane on which the vehicle 311 is positioned.

In FIG. 5A, FIG. 5B, and FIG. 5C, the autonomous travel assistance system 100 of the vehicle 311 calculates a relative position of the own vehicle to the position reference point 313 serving as a base point on the basis of an absolute position of the own vehicle and an absolute position of the position reference point 313 serving as a base point. Then, the autonomous travel assistance system 100 of the vehicle 311 transmits, as the vehicle position information 301 described above, information including the relative position of the own vehicle and identification information of the position reference point 313 serving as a base point. The vehicle position information 301 is transmitted to another vehicle via road-to-vehicle communication or vehicle-to-vehicle communication.

The position reference point 313 serving as a base point is an immediately near position reference point 313 positioned in the traveling direction of the vehicle 311.

*Description of Operation*

Own vehicle position processing by the vehicle position information processing unit 113 of the autonomous travel assistance system 100 will be described with reference to FIG. 6.

The own vehicle position processing is processing for generating vehicle position information 301 of the own vehicle and outputting the generated vehicle position information 301 to the communication system 111.

In Step S110, the vehicle position information processing unit 113 acquires an absolute position and a traveling direction of the own vehicle from the positioning system 112.

In Step S120, the vehicle position information processing unit 113 acquires position information (absolute position) and identification information of a position reference point 313 serving as a base point from the position reference point data 205 of the map database 200 on the basis of the absolute position of the own vehicle and the traveling direction of the own vehicle.

In Step S130, the vehicle position information processing unit 113 calculates a relative position of the own vehicle to the position reference point 313 on the basis of the absolute position of the own vehicle acquired in Step S110 and the absolute position of the position reference point 313 acquired in Step S120.

In Step S140, the vehicle position information processing unit 113 generates vehicle position information 301 including the identification information of the position reference point 313 acquired in Step S120 and the relative position of the own vehicle calculated in Step S130.

In Step S150, the vehicle position information processing unit 113 outputs the vehicle position information 301 generated in Step S140 to the communication system 111.

Another vehicle position processing by the vehicle position information processing unit 113 of the autonomous travel assistance system 100 will be described with reference to FIG. 7.

The another vehicle position processing is processing for specifying a position of another vehicle and outputting the specified position of the another vehicle to the vehicle control system 120.

In Step S210, the vehicle position information processing unit 113 acquires vehicle position information 301 of another vehicle from the communication system 111. The vehicle position information 301 of the another vehicle includes a relative position of the another vehicle and identification information of a position reference point 313 serving as a base point of the relative position.

Then, the vehicle position information processing unit 113 acquires the relative position of the another vehicle and the identification information of the position reference point 313 from the vehicle position information 301 of the another vehicle.

In Step S220, the vehicle position information processing unit 113 acquires position information (absolute position) associated with the same identification information as the identification information of the position reference point 313 acquired in Step S210 from the position reference point data 205 of the map database 200.

In Step S230, the vehicle position information processing unit 113 specifies a position of the another vehicle on the basis of the relative position of the another vehicle acquired in Step S210 and the position information of the position reference point acquired in Step S220.

The position of the another vehicle is an absolute position of the another vehicle or a relative position of the another vehicle to the own vehicle.

In Step S240, the vehicle position information processing unit 113 outputs the position of the another vehicle specified in Step S230 to the vehicle control system 120.

A specific example of operation of the vehicle position information processing unit 113 will be described.

In a case where a position reference point $Mr_{10}$ exists immediately near in a traveling direction of the own vehicle in Step S130, the vehicle position information processing unit 113 calculates a relative position of the own vehicle to the position reference point $Mr_{10}$.

In Step S210, the vehicle position information processing unit 113 acquires identification information ($Mr_{10}$) of the position reference point $Mr_{10}$ and a relative position of another vehicle to the position reference point $Mr_{10}$.

In Step S220, the vehicle position information processing unit 113 acquires an absolute position (north latitude of 35° 29'13", east longitude of 137° 24'8", and altitude of 312.9 m) associated with $Mr_{10}$ from the position reference point data 205 of FIG. 4.

In Step S230, the vehicle position information processing unit 113 specifies a relative position of the another vehicle to the own vehicle on the basis of the relative position of the own vehicle to the position reference point $Mr_{10}$ and the relative position of the another vehicle to the position reference point $Mr_{10}$.

Autonomous travel assistance at a junction of traffic lanes will be described with reference to FIG. 8.

(a) to (c) of FIG. 8 illustrate a change in positions of a vehicle A, a vehicle B, and a vehicle C.

The vehicle A is a vehicle 311 that is to join a main road.

The vehicle B and the vehicle C are vehicles 311 traveling on the main road.

The autonomous travel assistance system 100 is mounted on each of the vehicles A, B, and C.

The autonomous travel assistance system 100 of the vehicle A receives information of a relative position of the vehicle B to the position reference point 313 and information of a relative position of the vehicle C to the position reference point 313 at predetermined time intervals.

Then, the autonomous travel assistance system 100 of the vehicle A specifies the position of the vehicle B and the position of the vehicle C at predetermined time intervals by performing the another vehicle position processing described with reference to FIG. 7.

Then, the autonomous travel assistance system 100 of the vehicle A controls traveling of the vehicle A so that the vehicle A joins the main road at an appropriate timing on the basis of the positions of the respective vehicles B and C and speeds of the respective vehicles B and C. Note that the speeds can be calculated by using the positions specified at the predetermined time intervals.

As described above, the position reference point 313 having an absolute position that is common to the vehicle A to the vehicle C is set at the junction of the traffic lanes. Therefore, the autonomous travel assistance system 100 of the vehicle A can use the relative position of the vehicle B to the position reference point 313 and the relative position of the vehicle C to the position reference point 313. In addition, by using those relative positions, the autonomous travel assistance system 100 of the vehicle A can avoid a collision with the vehicle B and a collision with the vehicle C.

A problem that arises in a case where there is an error in position information of a position reference point that each vehicle has will be described with reference to FIG. 9 and FIG. 10.

Figure 9:
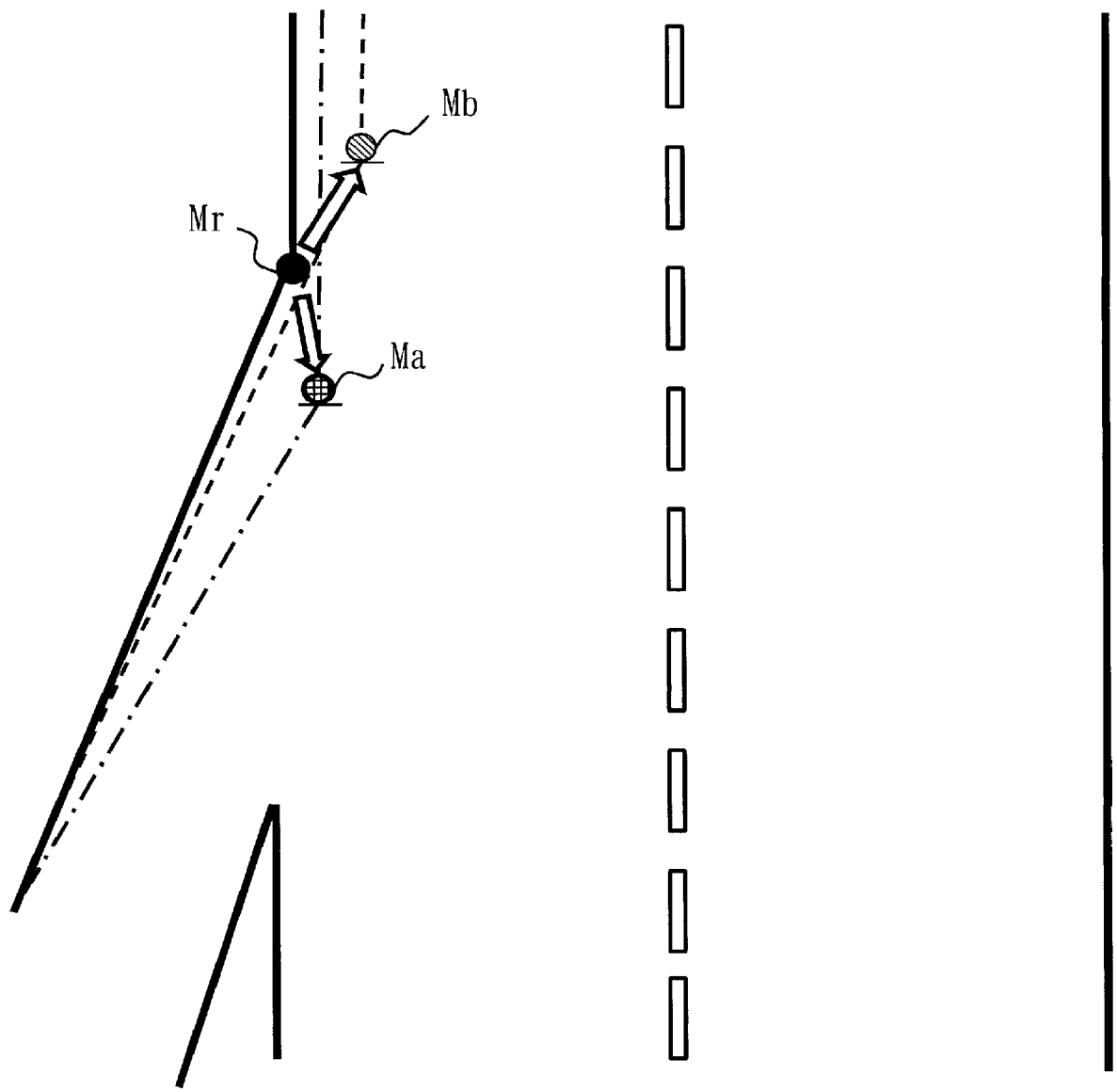
FIG. 9 is a diagram for describing a case where position information of a position reference point in Embodiment 1 has an error.

In FIG. 9, a solid line indicates a real road. An alternate long and short dash line indicates a road on a map A. A broken line indicates a road on a map B.

Further, a position reference point Mr indicates a position reference point on the real road. A position reference point Ma indicates a position reference point on the map A. A position reference point Mb indicates a position reference point on the map B. Each position reference point is provided at a junction of the road.

The map A and the map B include measurement errors and the like.

Therefore, an error occurs in positions of the road on the map A and the map B with respect to a position on the real road.

With this, an error also occurs in positions of the position reference points (Ma and Mb) on the map A and the map B with respect to a position of the position reference point Mr.

Figure 10:
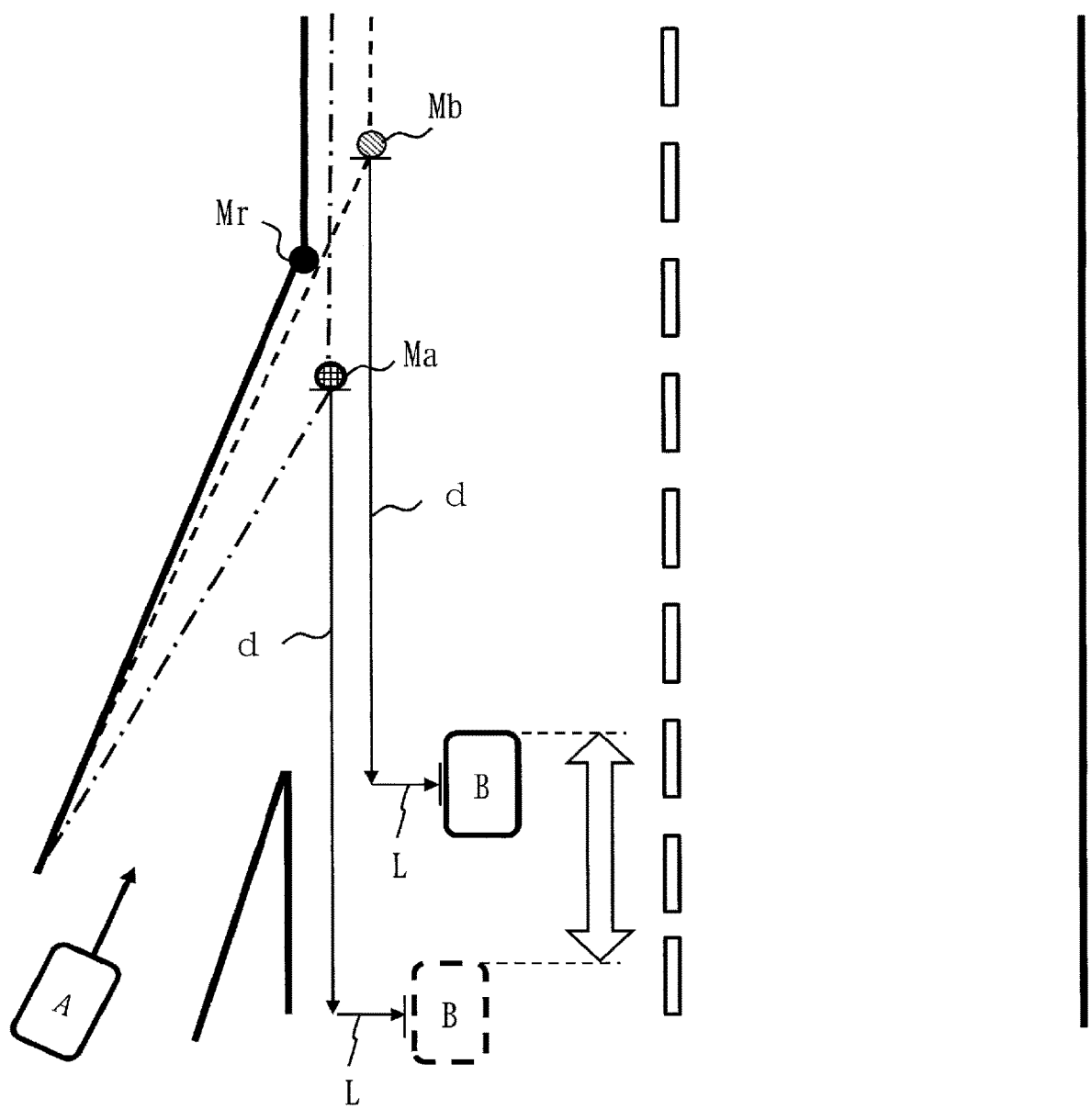
FIG. 10 is a diagram for describing a case where position information of a position reference point in Embodiment 1 has an error.

In FIG. 10, the vehicle A is the vehicle 311 that uses the map A, and the vehicle B is the vehicle 311 that uses the map B.

The vehicle A needs position information of the vehicle B traveling on the main road because the vehicle A is to join the main road.

The vehicle B transmits a relative position (distance d and offset L) of the own vehicle to the position reference point Mb on the map B.

The vehicle A acquires the relative position of the vehicle B.

The vehicle A calculates a position of the vehicle B on the basis of the acquired relative position of the vehicle B and the position of the position reference point Ma on the map A.

The position of the position reference point Ma on the map A is different from the position of the position reference point Mb on the map B, and therefore an error occurs between the position of the vehicle B calculated by the vehicle A and the position of the vehicle B on the real road.

In other words, the vehicle A cannot accurately specify the position of the vehicle B. As a result, the vehicle A cannot achieve appropriate autonomous travel.

A radar for specifying a position of another vehicle may be mounted on each vehicle. The radar mounted on the vehicle will be referred to as "in-vehicle radar".

In a case where a position of another vehicle can be specified by the in-vehicle radar, the autonomous travel assistance device 110 of the own vehicle specifies the position of the another vehicle by using the in-vehicle radar. In a case where the position of the another vehicle cannot be specified by the in-vehicle radar, the autonomous travel assistance device 110 of the own vehicle specifies the position of the another vehicle by using a relative position of the another vehicle to the position reference point 313.

It is expected that, in a case where, for example, a general road and an expressway are divided by a noise barrier wall or the like or a general road and an expressway have a difference in height, a radar signal from the in-vehicle radar of the own vehicle cannot be transmitted to another vehicle when the own vehicle joins the expressway from the general road. Even in such a case, the autonomous travel assistance device 110 of the own vehicle can specify a position of the another vehicle by using a relative position of the another vehicle to the position reference point 313. On the contrary, in a case where a radar signal from the in-vehicle radar can be transmitted to another vehicle, the autonomous travel assistance device 110 of the own vehicle only needs to specify a position of the another vehicle by using the in-vehicle radar.

*Description of Hardware Configuration*

Figure 11:
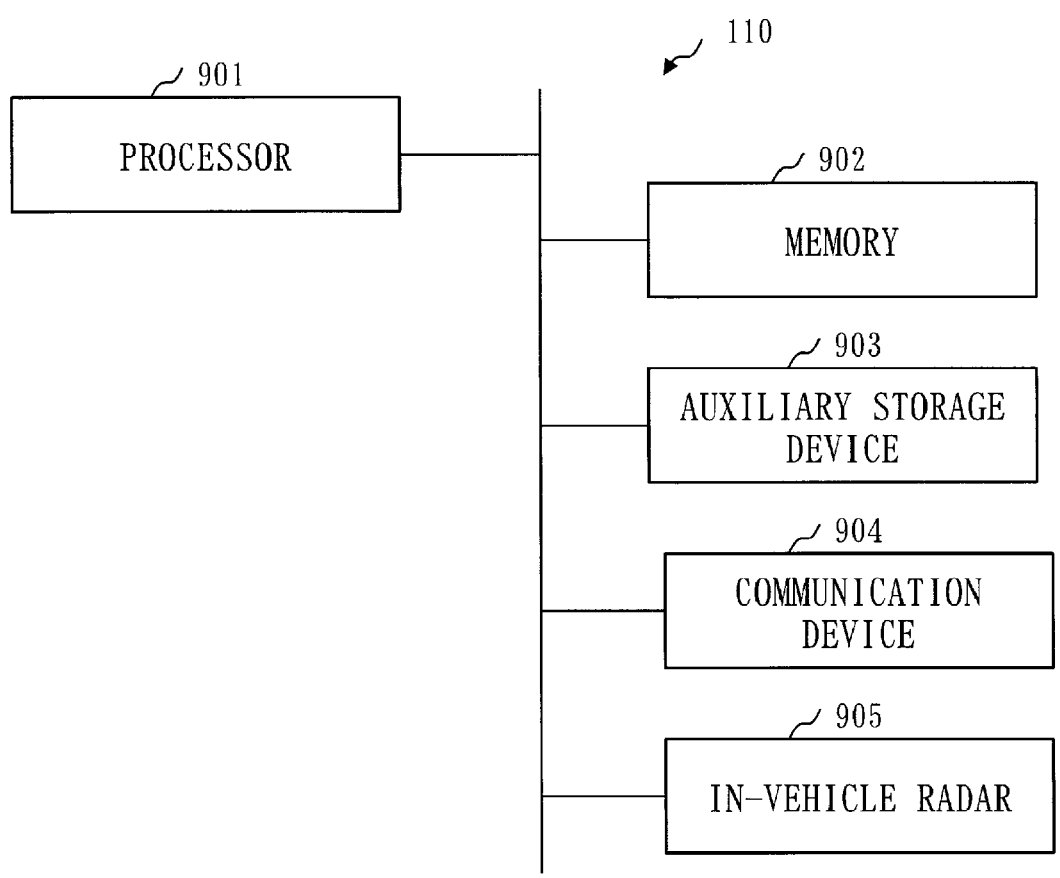
FIG. 11 is a hardware configuration diagram of an autonomous travel assistance device 110 in Embodiment 1.

A hardware configuration of the autonomous travel assistance device 110 will be described with reference to FIG. 11.

The autonomous travel assistance device 110 is a computer provided with hardware such as a processor 901, a memory 902, an auxiliary storage device 903, a communication device 904, and an in-vehicle radar 905. The processor 901 is connected to another hardware via a signal line.

The processor 901 is an integrated circuit (IC) that performs processing and controls another hardware. Specifically, the processor 901 is a central processing unit (CPU).

The memory 902 is a volatile storage device. The memory 902 is also referred to as a main storage device or a main memory. Specifically, the memory 902 is a random access memory (RAM).

The auxiliary storage device 903 is a non-volatile storage device. Specifically, the auxiliary storage device 903 is a ROM, an HDD, or a flash memory. The ROM is an abbreviation for read only memory, and the HDD is an abbreviation for hard disk drive.

The communication device 904 is a device that performs communication and is provided with a receiver and a transmitter. Specifically, the communication device 904 is a communication chip or a network interface card (NIC).

The in-vehicle radar 905 is a radar mounted on the vehicle 311. The radar transmits a radar signal and receives the radar signal that has been reflected and has returned, thereby specifying a position of an object that has reflected the radar signal.

The autonomous travel assistance device 110 is provided with the vehicle position information processing unit 113 and the positioning system 112 as elements of a functional configuration. The vehicle position information processing unit 113 is provided with a specification unit and a calculation unit. The positioning system 112 is provided with a measurement unit. Functions of those elements are achieved by software. Hereinafter, those elements will be referred to as "units".

A program that achieves functions of the "units" is stored on the auxiliary storage device 903. The program that achieves the functions of the "units" is loaded into the memory 902 and is executed by the processor 901.

Further, an operating system (OS) is stored on the auxiliary storage device 903. At least part of the OS is loaded into the memory 902 and is executed by the processor 901.

In other words, the processor 901 executes the program that achieves the functions of the "units" while executing the OS.

Data obtained by executing the program that achieves the functions of the "units" is stored on a storage device such as the memory 902, the auxiliary storage device 903, a register in the processor 901, or a cache memory in the processor 901. Those storage devices function as a storage unit that stores data.

Note that the autonomous travel assistance device 110 may be provided with a plurality of processors 901, and the plurality of processors 901 may cooperatively execute the program that achieves the functions of the "units".

The processor 901 functions as the vehicle position information processing unit 113 and the positioning system 112.

The auxiliary storage device 903 functions as the map database 200. The communication device 904 functions as the communication system 111. Further, the receiver of the communication device 904 functions as a receiving unit that receives data, and the transmitter of the communication device 904 functions as a transmitting unit that transmits data.

Hardware collectively including the processor 901, the memory 902, and the auxiliary storage device 903 is referred to as "processing circuitry".

The "units" may be read as "processing" or "steps". The functions of the "units" may be achieved by firmware.

The program that achieves the functions of the "units" can be stored on a non-volatile storage medium such as a magnetic disc, an optical disc, or a flash memory.

Figure 12:
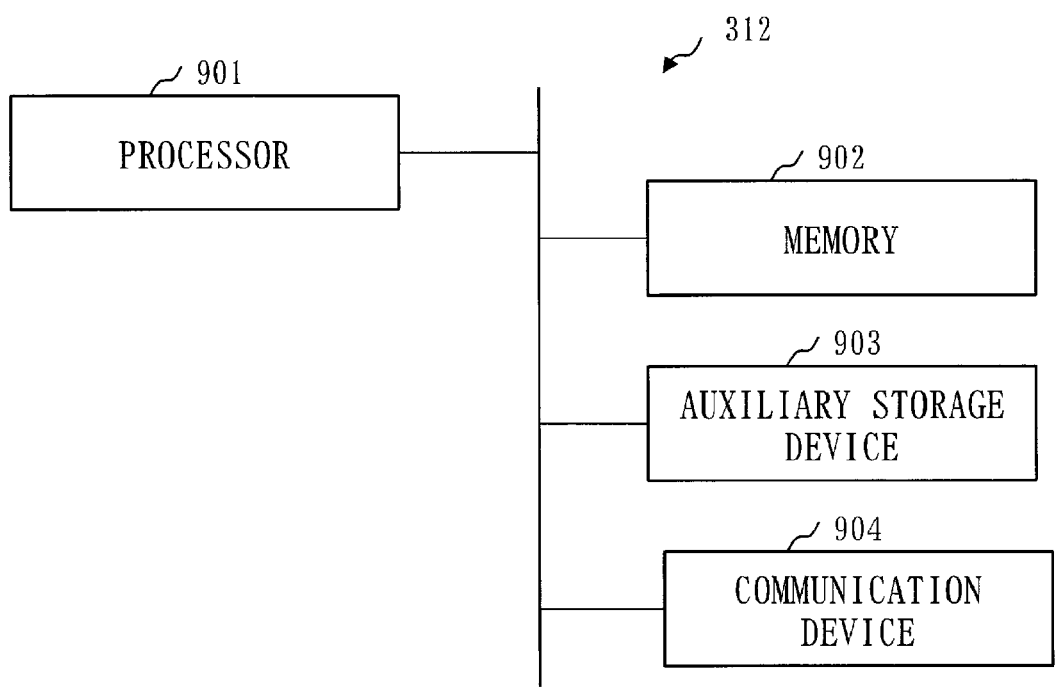
FIG. 12 is a hardware configuration diagram of a roadside device 312 in Embodiment 1.

A hardware configuration of the roadside device 312 will be described with reference to FIG. 12. Description similar to the description of FIG. 11 will be omitted or simplified.

The roadside device 312 is a computer provided with hardware such as the processor 901, the memory 902, the auxiliary storage device 903, and the communication device 904.

The processor 901 controls another hardware.

The storage device such as the memory 902, the auxiliary storage device 903, the register in the processor 901, or the cache memory in the processor 901 functions as a storage unit that stores data.

The communication device 904 includes a receiver and a transmitter. The receiver functions as a receiving unit that receives data, and the transmitter functions as a transmitting unit that transmits data.

*Description of features of Embodiment 1*

The autonomous travel assistance device 110 is provided with a storage unit, a receiving unit, and a specification unit.

The storage unit stores the position reference point data 205 including identification information of the position reference point 313 and an absolute position of the position reference point 313.

The receiving unit receives the identification information of the position reference point 313 and a relative position of another vehicle to the absolute position of the position reference point 313.

The specification unit acquires the absolute position of the position reference point 313 from the position reference point data 205 on the basis of the received identification information of the position reference point 313. Then, the specification unit specifies a position of the another vehicle on the basis of the acquired absolute position of the position reference point 313 and the received relative position of the another vehicle.

The autonomous travel assistance device 110 is further provided with a measurement unit, a calculation unit, and a transmitting unit.

Further, the position reference point data 205 includes identification information and an absolute position of each of a plurality of position reference points 313.

The measurement unit measures a position of the own vehicle.

The calculation unit acquires, from the position reference point data 205, identification information and an absolute position of an immediately near position reference point 313 positioned in a traveling direction of the own vehicle. Then, the calculation unit calculates a relative position of the own vehicle to the immediately near position reference point 313 on the basis of the acquired absolute position of the immediately near position reference point 313 and the measured position of the own vehicle.

The transmitting unit transmits the acquired identification information of the immediately near position reference point 313 and the calculated relative position of the own vehicle to another vehicle.

The roadside device 312 is provided with a receiving unit and a transmitting unit.

The receiving unit receives, from a first vehicle storing the position reference point data 205 including identification information and an absolute position of each position reference point 313, identification information of an immediately near position reference point 313 positioned in a traveling direction of the first vehicle and a relative position of the first vehicle to the immediately near position reference point 313.

The transmitting unit transmits the received identification information of the immediately near position reference point 313 and the received relative position of the first vehicle to a second vehicle that is a vehicle storing the position reference point data 205 and is a vehicle traveling toward the immediately near position reference point 313 of the first vehicle.

The autonomous travel assistance system 100 is provided with the roadside device 312 provided on a road and the autonomous travel assistance device 110 mounted on a first vehicle.

The roadside device 312 includes a receiving unit and a transmitting unit. The receiving unit of the roadside device 312 receives, from a second vehicle storing the position reference point data 205 including identification information and an absolute position of each position reference point 313, identification information of an immediately near position reference point positioned in a traveling direction of the second vehicle and a relative position of the second vehicle to the immediately near position reference point.

The transmitting unit of the roadside device 312 transmits the received identification information of the immediately near position reference point and the received relative position of the second vehicle to the first vehicle.

The autonomous travel assistance device 110 is provided with a receiving unit, a storage unit, and a specification unit.

The receiving unit of the autonomous travel assistance device 110 receives the identification information of the immediately near position reference point and the relative position of the second vehicle transmitted from the roadside device 312.

The storage unit of the autonomous travel assistance device 110 stores the position reference point data 205.

The specification unit of the autonomous travel assistance device 110 acquires the absolute position of the immediately near position reference point 313 from the position reference point data 205 stored in the storage unit on the basis of the received identification information of the immediately near position reference point 313. Then, the specification unit of the autonomous travel assistance device 110 specifies a position of the second vehicle on the basis of the acquired absolute position of the immediately near position reference point and the received relative position of the second vehicle.

\*\*\*Effects of Embodiment 1\*\*\*

Relative positions of other vehicles based on a position reference point having an absolute position used in common by vehicles are mutually used by the vehicles. Therefore, even in a case where maps used in navigation systems of the respective vehicles are different and there is a difference in coordinate value between the maps, it is possible to accurately specify a position of another vehicle. With this, in an area such as a junction, an intersection, or a diverging point of traffic lanes, it is possible to avoid a collision with another vehicle traveling toward the area.

The own vehicle allows another vehicle to accurately specify a position of the own vehicle because the own vehicle transmits identification information of a position reference point and a relative position of the own vehicle to the position reference point.

The roadside device transmits identification information of a position reference point acquired from each vehicle and a relative position of the vehicle to the position reference point to another vehicle. Therefore, even in a case where vehicles cannot directly communicate with each other because an obstruction or the like exists between the vehicles, one vehicle can accurately specify a position of the other vehicle.

\*\*\*Supplementation of Embodiment 1\*\*\*

Embodiment 1 is an example of a preferable embodiment and does not intend to restrict a technological scope of the invention. Embodiment 1 may be partly implemented or may be implemented in combination with another embodiment. The procedures described with reference to the flowcharts and the like may be appropriately changed.

REFERENCE SIGNS LIST

100: autonomous travel assistance system, 110: autonomous travel assistance device, 111: communication system, 112: positioning system, 113: vehicle position information processing unit, 120: vehicle control system, 200: map database, 201: division line data, 202: intersection data, 203: stop line data, 204: traffic light data, 205: position reference point data, 206: traffic lane link data, 207: roadway link data, 290: map data, 301: vehicle position information, 311: vehicle, 312: roadside device, 313: position reference point, 901: processor, 902: memory, 903: auxiliary storage device, 904: communication device, 905: in-vehicle radar.

The invention claimed is:

1. An autonomous travel assistance device mounted on a vehicle, the autonomous travel assistance device comprising:

a memory configured to store, in advance, map data that includes position reference point data including identification information of a position reference point and absolute coordinate information of the position reference point being set at a junction at which traffic lanes join or at a diverging point at which the traffic lanes diverge in an intersection area where the traffic lanes intersect, join, or diverge and position information of the position reference point that is common to another vehicle; and processing circuitry configured to
receive the identification information of the position reference point and a relative position of the another vehicle to the position information of the position reference point; and
acquire the position information of the position reference point from the position reference point data on the basis of the received identification information of the position reference point and specify a position of the another vehicle on the basis of the acquired position information of the position reference point and the received relative position of the another vehicle, wherein the relative position of the another vehicle is expressed by using a distance between the position reference point and the another vehicle in a length direction of a road and a number of traffic lanes between a traffic lane on which the position reference point is positioned and a traffic lane on which the another vehicle is positioned.

2. The autonomous travel assistance device according to claim 1, wherein:
the position reference point data includes identification information and position information of each of a plurality of position reference points; and
the processing circuitry is further configured to:
measure a position of the vehicle,
acquire identification information and position information of an immediately near position reference point positioned in a traveling direction of the vehicle from the position reference point data and calculate a relative position of the vehicle to the immediately near position reference point on the basis of the acquired position information of the immediately near position reference point and the measured position of the vehicle, and a transmitting unit to transmit the acquired identification information of the immediately near position reference point and the calculated relative position of the vehicle to the another vehicle.

3. A roadside device comprising:
processing circuitry configured to
receive, from a first vehicle storing position reference point data including identification information and position information of each position reference point being set at a junction at which traffic lanes join or at a diverging point at which the traffic lanes diverge in an intersection area where the traffic lanes intersect, join, or diverge, identification information of an immediately near position reference point positioned in a traveling direction of the first vehicle and a relative position of the first vehicle to the immediately near position reference point; and
transmit the received identification information of the immediately near position reference point and the received relative position of the first vehicle to a second vehicle that is a vehicle storing the position reference point data and is a vehicle traveling toward the immediately near position reference point,
wherein the relative position of the first vehicle is expressed by using a distance between the position reference point and the first vehicle in a length direction of a road and a number of traffic lanes between a traffic lane on which the position reference point is positioned and a traffic lane on which the first vehicle is positioned.

4. An autonomous travel assistance system comprising:
a roadside device provided on a road; and
an autonomous travel assistance device mounted on a first vehicle,
wherein:
the roadside device comprises:
processing circuitry configured to
receive, from a second vehicle storing position reference point data including identification information and position information of each position reference point being set at a junction at which traffic lanes join or at a diverging point at which the traffic lanes diverge in an intersection area where the traffic lanes intersect, join, or diverge, identification information of an immediately near position reference point positioned in a traveling direction of the second vehicle and a relative position of the second vehicle to the immediately near position reference point, and
transmit the received identification information of the immediately near position reference point and the received relative position of the second vehicle to the first vehicle;
the autonomous travel assistance device comprises:
processing circuitry configured to
receive the identification information of the immediately near position reference point and the relative position of the second vehicle transmitted from the roadside device,
store the position reference point data in a memory,
acquire position information of the immediately near position reference point from the position reference point data stored on the storage unit on the basis of the received identification information of the immediately near position reference point and specify a position of the second vehicle on the basis of the acquired position information of the immediately near position reference point and the received relative position of the second vehicle; and
the relative position of the second vehicle is expressed by using a distance between the position reference point and the second vehicle in a length direction of a road and a number of traffic lanes between a traffic lane on which the position reference point is positioned and a traffic lane on which the second vehicle is positioned.

* * * * *